US011017503B2

(12) United States Patent
Omer et al.

(10) Patent No.: US 11,017,503 B2
(45) Date of Patent: May 25, 2021

(54) TECHNIQUES FOR ATMOSPHERIC AND SOLAR CORRECTION OF AERIAL IMAGES

(71) Applicant: Microsoft Technology Licensing, LLC, Redmond, WA (US)

(72) Inventors: Ido Omer, Seattle, WA (US); Yuxiang Liu, Superior, CO (US); Wolfgang Schickler, Broomfield, CO (US); Robert Ledner, Boulder, CO (US); Leon Rosenshein, Louisville, CO (US); David Simons, Louisville, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 160 days.

(21) Appl. No.: 15/437,140

(22) Filed: Feb. 20, 2017

(65) Prior Publication Data
US 2017/0161878 A1 Jun. 8, 2017

Related U.S. Application Data

(63) Continuation of application No. 12/973,689, filed on Dec. 20, 2010, now Pat. No. 9,576,349.

(51) Int. Cl.
*G06T 5/00* (2006.01)
*H04N 5/232* (2006.01)
(Continued)

(52) U.S. Cl.
CPC .............. *G06T 5/002* (2013.01); *G06T 5/008* (2013.01); *G06T 5/20* (2013.01); *G06T 5/50* (2013.01);
(Continued)

(58) Field of Classification Search
CPC . G06T 2207/10032; G06T 2207/10036; G06T 2207/20076; G06T 2207/20216;
(Continued)

(56) References Cited

U.S. PATENT DOCUMENTS 3,030,061 A 4/1962 Jennings
5,841,911 A * 11/1998 Kopeika ................. G06T 5/003
382/254
(Continued)

FOREIGN PATENT DOCUMENTS

CN 101908210 A 12/2010

OTHER PUBLICATIONS

Wang et al., Atmospheric Correction at Aeronet Locations: A New Science and Validation Data Set, Aug. 2009, IEEE Transactions on Geoscience and Remote Sensing, vol. 47, No. 8, pp. 2450-2466 (Year: 2009).*
(Continued)

*Primary Examiner* — Joseph G Ustaris
*Assistant Examiner* — Jill D Sechser

(57) ABSTRACT

Techniques for atmospheric and solar correction of aerial images are described. An apparatus may comprise an atmospheric and solar component arranged for execution by a logic device and operative to correct solar and atmosphere artifacts from an aerial image. The atmospheric and solar component may comprise an image information component operative to generate an image record for each aerial image of a group of aerial images, the image record comprising statistical information and image context information for each aerial image, a filter generation component operative to generate an atmospheric filter and a solar filter from the statistical information and the image context information stored in the image records, and an image correction component operative to correct atmospheric and solar artifacts from the aerial image using the respective atmospheric filter and solar filter. Other embodiments are described and claimed.

20 Claims, 11 Drawing Sheets

(51) Int. Cl.

| | | |
|---|---|---|
| G06T 5/20 | (2006.01) | |
| G06T 5/50 | (2006.01) | |
| G06T 7/60 | (2017.01) | |
| G01C 11/02 | (2006.01) | |
| G01C 11/00 | (2006.01) | |
| G06K 9/40 | (2006.01) | |
| G06T 3/40 | (2006.01) | |

(52) U.S. Cl.
CPC ........... *G06T 7/60* (2013.01); *H04N 5/23238* (2013.01); *G01C 11/00* (2013.01); *G01C 11/02* (2013.01); *G06K 9/40* (2013.01); *G06T 3/4038* (2013.01); *G06T 2207/10016* (2013.01); *G06T 2207/10024* (2013.01); *G06T 2207/10032* (2013.01); *G06T 2207/20076* (2013.01)

(58) Field of Classification Search
CPC ... G06T 2207/30181; G06T 5/40; G06T 5/50; G06T 3/4038; G06T 7/11; G06T 7/174; G06T 7/254; G06T 7/30; G06T 7/35; G06T 7/60; G06T 7/97; G06K 9/0063; G06K 9/40; G06K 9/46; G06K 9/4642; G06K 9/4647; G06K 9/4661; G06K 2009/2045; G01C 11/00; G01C 11/02; G01C 11/025; G01C 11/04; G01C 11/06; H04N 1/56; H04N 1/60; H04N 1/6083; H04N 1/6086; H04N 5/23238; G01S 17/88; G01S 17/89; G01S 17/95; G03B 15/04; B64G 1/1021; B64G 2001/1028; B64G 2001/1035; B64G 2001/1042; G01N 21/538

See application file for complete search history.

(56) References Cited

U.S. PATENT DOCUMENTS

| | | | |
|---|---|---|---|
| 6,484,099 B1 | 11/2002 | Holzer-Popp et al. | |
| 6,757,445 B1 | 6/2004 | Knopp | |
| 7,019,777 B2* | 3/2006 | Sun | H04N 5/33 348/263 |
| 7,593,835 B2* | 9/2009 | Anderson | G01N 21/31 382/274 |
| 7,653,218 B1 | 1/2010 | Malitz et al. | |
| 7,725,258 B2* | 5/2010 | Smitherman | G01C 11/02 348/144 |
| 7,965,902 B1* | 6/2011 | Zelinka | G06F 17/3028 348/218.1 |
| 8,340,461 B2* | 12/2012 | Sun | G06K 9/40 358/3.26 |
| 8,447,129 B2* | 5/2013 | Arrasmith | H04N 5/225 382/131 |
| 8,666,190 B1* | 3/2014 | Marwood | G06K 9/0063 382/164 |
| 8,897,543 B1* | 11/2014 | Lin | G06K 9/46 382/154 |
| 9,036,861 B2 | 5/2015 | Chen et al. | |
| 9,097,792 B2* | 8/2015 | Kelly | G01S 3/7803 |
| 9,396,528 B2* | 7/2016 | Pacifici | G06T 5/001 |
| 9,576,349 B2 | 2/2017 | Omer et al. | |
| 9,710,721 B2* | 7/2017 | Ardouin | G06K 9/46 |
| 2001/0019625 A1* | 9/2001 | Kenan | G03F 7/70125 382/144 |
| 2001/0036304 A1* | 11/2001 | Yang | G06K 9/0014 382/132 |
| 2002/0096622 A1 | 7/2002 | Adler-Golden et al. | |
| 2002/0186879 A1* | 12/2002 | Hemar | G01N 21/95607 382/149 |
| 2004/0153284 A1* | 8/2004 | Bernstein | G01J 3/28 702/178 |
| 2005/0151965 A1* | 7/2005 | Bissett, III | G01J 3/28 356/328 |
| 2005/0175253 A1* | 8/2005 | Li | G06K 9/0063 382/260 |
| 2005/0265631 A1 | 12/2005 | Mai et al. | |
| 2006/0050984 A1* | 3/2006 | Tilton | G06K 9/0063 382/275 |
| 2006/0126959 A1* | 6/2006 | Padwick | G06K 9/0063 382/254 |
| 2006/0273242 A1* | 12/2006 | Hunsche | G03F 7/70666 250/208.1 |
| 2007/0046448 A1* | 3/2007 | Smitherman | G01C 11/02 340/431 |
| 2008/0100803 A1 | 5/2008 | Dick et al. | |
| 2008/0123990 A1 | 5/2008 | Won et al. | |
| 2009/0196487 A1* | 8/2009 | Yishai | G06T 7/0004 382/145 |
| 2009/0232349 A1* | 9/2009 | Moses | G06F 9/5072 382/100 |
| 2010/0008595 A1* | 1/2010 | Riley | G06K 9/0063 382/254 |
| 2010/0040300 A1* | 2/2010 | Kang | G06K 9/00664 382/255 |
| 2010/0092045 A1 | 4/2010 | Zimmer et al. | |
| 2010/0145659 A1* | 6/2010 | Busch | G01J 3/28 702/190 |
| 2010/0177095 A1* | 7/2010 | Watkins | G06T 15/60 345/426 |
| 2010/0259651 A1* | 10/2010 | Fattal | G06T 5/003 348/241 |
| 2010/0303344 A1* | 12/2010 | Sato | H04N 9/045 382/162 |
| 2011/0025919 A1* | 2/2011 | Vorontsov | G06T 5/001 348/607 |
| 2011/0026834 A1* | 2/2011 | Hirasawa | G06T 7/97 382/203 |
| 2011/0043603 A1* | 2/2011 | Schechner | G06T 5/50 348/25 |
| 2011/0188775 A1* | 8/2011 | Sun | G06K 9/40 382/274 |
| 2011/0211758 A1* | 9/2011 | Joshi | G06T 5/003 382/167 |
| 2014/0072216 A1* | 3/2014 | Fang | G06T 5/009 382/167 |

OTHER PUBLICATIONS

Liang et al., An Improved Atmospheric Correction Algorithm for Hyperspectral Remotely Sensed Imagery, Apr. 2004, IEEE Geoscience and Remote Sensing Letters, vol. 1, No. 2, pp. 112-117 (Year: 2004).*

"Atmosphere and Shading Compensation of Satellite Images", Retrieved from <<https://web.archive.org/web/20080411123610/http://www.imagico.de/pov/earth_atmosphere.html>>, Apr. 11, 2008, 5 Pages.

"Conferences Web Events Microsoft's Vexcel Imaging GmbH Reports Sales of 30 UltraCam Systems for Its 2010 Fiscal Year", Retrieved from <<https://web.archive.org/web/20101014130125/http://www.microsoft.com/ultracam/en-us/Aug1030Ultracams.aspx>>, Aug. 19, 2010, 2 Pages.

"Corrected Notice of Allowance Issued in U.S Appl. No. 12/973,689", dated Nov. 2, 2016, 2 Pages.

"Final Office Action Issued in U.S Appl. No. 12/973,689", dated Apr. 8, 2016, 28 Pages.

"Final Office Action Issued in U.S Appl. No. 12/973,689", dated Feb. 21, 2014, 37 Pages.

"Non Final Office Action Issued in U.S Appl. No. 12/973,689", dated Aug. 14, 2015, 32 Pages.

"Non Final Office Action Issued in U.S Appl. No. 12/973,689", dated Jul. 19, 2013, 34 Pages.

"Notice of Allowance Issued in U.S Appl. No. 12/973,689", dated Oct. 3, 2016, 9 Pages.

"First Office Action Issued in Chinese Patent Application No. 201110429145.X", dated Dec. 17, 2013, 9 Pages. (W/o English Translation).

(56) References Cited

OTHER PUBLICATIONS

Haest, et al., "Radiometric Calibration of Digital Photogrammetric Camera Image Data", In Proceedings of the ASPRS Annual Conference, Mar. 2009, 13 Pages.
"Second Office Action Issued in Chinese Patent Application No. 201110429145.X", dated Aug. 1, 2014, 10 Pages.
"Third Office Action Issued in Chinese Patent Application No. 201110429145.X", dated Feb. 15, 2015, 6 Pages.
"Notice of Allowance Issued in Chinese Patent Application No. 201110429145.X", dated Jul. 2, 2015, 4 Pages.
U.S. Appl. No. 12/973,689, Amendment and Response filed Oct. 21, 2013, 13 pgs.
U.S. Appl. No. 12/973,689, Amendment and Response filed Jun. 23, 2014, 13 pgs.
U.S. Appl. No. 12/973,689, Amendment and Response filed Dec. 14, 2015, 13 pgs.
U.S. Appl. No. 12/973,689, Amendment and Response filed Aug. 8, 2016, 9 pgs.
U.S. Appl. No. 12/973,689, Amendment after Allowance filed Jan. 3, 2017, 3 pgs.

\* cited by examiner

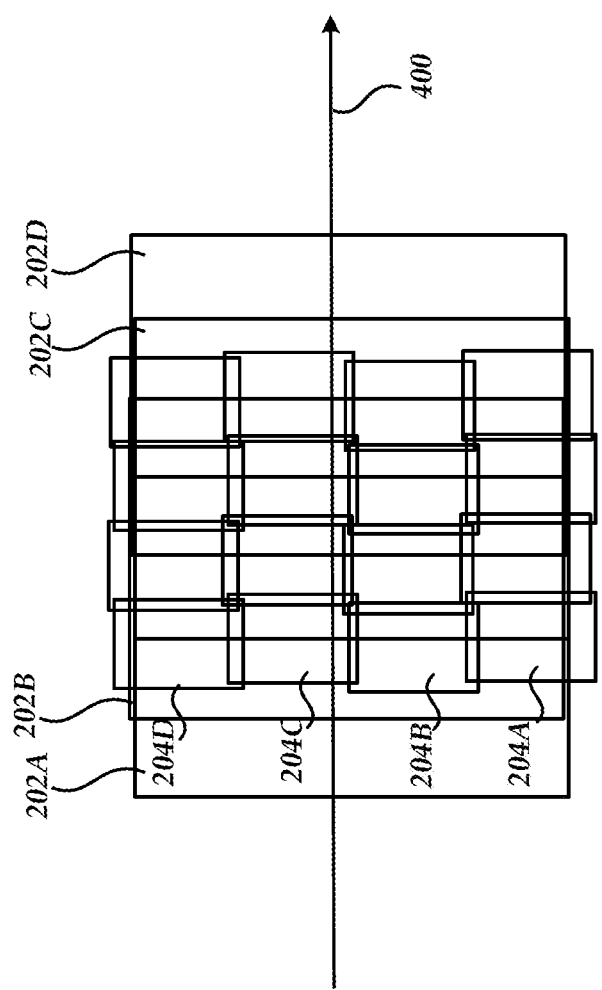

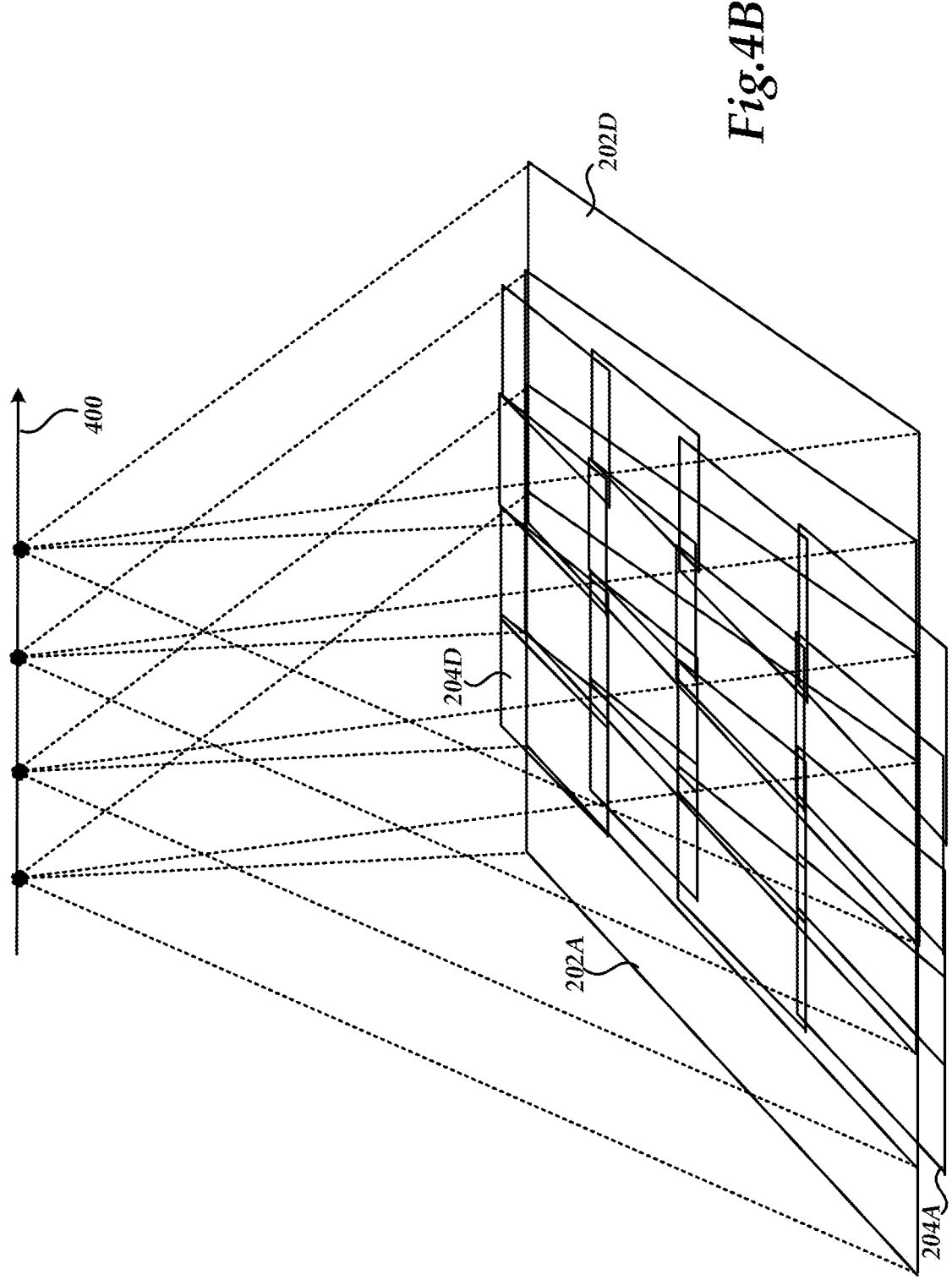

TECHNIQUES FOR ATMOSPHERIC AND SOLAR CORRECTION OF AERIAL IMAGES

RELATED APPLICATION

This application claims priority to U.S. patent application Ser. No. 12/973,689, filed on Dec. 20, 2010, issued U.S. Pat. No. 9,576,349, entitled "TECHNIQUES FOR ATMOSPHERIC AND SOLAR CORRECTION OF AERIAL IMAGES", which is related to commonly owned U.S. patent application Ser. No. 12/624,412 titled "MULTI-RESOLUTION DIGITAL LARGE FORMAT CAMERA WITH MULTIPLE DETECTOR ARRAYS" filed on Nov. 24, 2009, issued as U.S. Pat. No. 8,665,316, which is hereby incorporated by reference in its entirety.

BACKGROUND

Aerial imaging refers to capturing images of a surface of a planet from an elevated position, such as an aircraft or satellite. Aerial imaging is used in cartography, such as for providing photogrammetric surveys, which are often a basis for topographic maps. Depending on a given elevation for a camera, aerial imaging may capture undesired visual elements obscuring surface objects in an image. Removing undesired visual elements may be difficult, however, particularly when multiple aerial images are stitched together to form a composite aerial image, such as an "ortho mosaic" or aerial map. It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Embodiments are generally directed to advanced image processing techniques for aerial images. Some embodiments are particularly directed to advanced image processing techniques specifically designed to correct atmospheric and solar influences in aerial images. As elevation for a camera increases, the camera may acquire an aerial image with an increasing number of atmospheric and solar influences, such as light scattering and absorption due to aerosols in the atmosphere. The atmospheric and solar influences potentially obscure surface objects in an aerial image acquired by the aerial camera, among other problems.

Embodiments implement various atmospheric and solar correction techniques to correct atmospheric and solar influences in aerial images. In one embodiment, for example, an atmospheric and solar component is arranged for execution by a logic device and operative to correct solar and atmosphere artifacts from an aerial image. The atmospheric and solar component may comprise, among other elements, an image information component operative to generate an image record for each aerial image of a group of aerial images, the image record comprising statistical information and image context information for each aerial image. The atmospheric and solar component may further comprise a filter generation component operative to generate an atmospheric filter and a solar filter from the statistical information and the image context information stored in the image records. The atmospheric and solar component may still further comprise an image correction component operative to correct atmospheric and solar artifacts from the aerial image using the respective atmospheric filter and solar filter. In this manner, the atmospheric and solar component may provide enhanced aerial images providing a greater degree of visual acuity and accurate reproduction of surface objects in the aerial images. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 4A is a schematic diagram showing a top-down view that illustrates the overlap between the footprint of a sequence of consecutive images taken with a primary camera system and the footprint of a sequence of consecutive images taken with four secondary camera systems in a large format digital camera presented one embodiment disclosed herein;

FIG. 4B is a schematic diagram showing a perspective view that illustrates the overlap between the footprint of a sequence of consecutive images taken along a flight line with a primary camera system and the footprint of a sequence of consecutive images taken with four secondary camera systems in a large format digital camera presented one embodiment disclosed herein;

DETAILED DESCRIPTION

Figure 1:
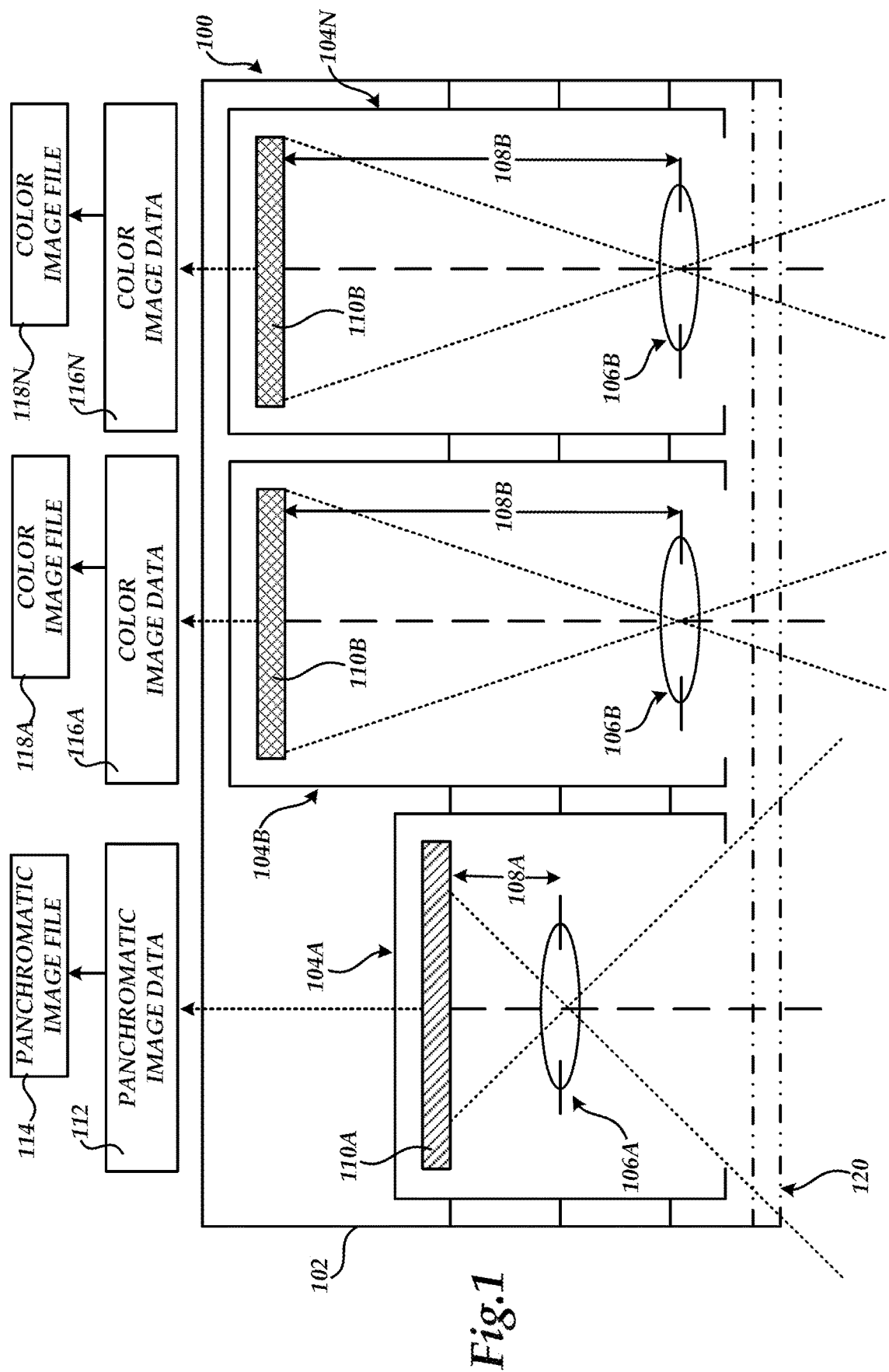
FIG. 1 is a schematic diagram showing aspects of a multi-resolution digital large format camera with multiple detector arrays provided in one embodiment presented herein.

Embodiments are generally directed to advanced image processing techniques for aerial images. Some embodiments are particularly directed to advanced image processing techniques specifically designed to correct for atmospheric and solar influences of aerial images acquired using, for example, a large format aerial camera.

In general, an atmosphere for a planet is a hostile environment for aerial image acquisition and processing. At higher elevations, a large format digital camera may acquire aerial images having undesired visual elements obscuring surface objects in the aerial images. For instance, the aerial images may have a number of atmospheric and solar influences, such as light scattering and absorption due to aerosols in the atmosphere. Light scattering may include, for example, Rayleigh scattering and Mie scattering. Aerosols may include gaseous, liquid and solid particles. At a normal flight altitude of 18,500 feet, for example, atmospheric and solar influences introduce a range-dependent haze (e.g., brightness changes) and discoloration (e.g., blue-tint) on each pixel in an aerial image. This range-dependent haze and discoloration should be corrected and separated from the actual scene content on the ground or surface of the earth. Further, in larger image acquisitions, such as those spanning multiple days, a significant difference in solar irradiance in two or more flight lines may be introduced. This brightness difference makes subsequent correction, such as a bidirectional reflectance distribution function (BRDF) correction, more difficult or expensive to perform. As a result, there is a significant need to correct for atmospheric and solar influences obscuring surface objects in an aerial image acquired by a large format digital camera.

To correct for any undesired atmospheric influence, advanced image processing techniques attempt to model and derive a robust atmosphere linear mask that is optimal for each pixel in each aerial image, while remaining insensitive (or independent) of scene content on the ground. To correct for any undesired solar influence, advanced image processing techniques attempt to derive a robust solar irradiance model and a camera model that can adjust brightness for each image to a preset mean brightness through scaling techniques.

Advanced image processing techniques as described herein may provide significant advantages over conventional image processing techniques. For example, previous solutions such as dark object subtraction (DOS) techniques derive only an offset for each channel of one aerial image and only model an additive effect of the atmosphere. The advanced image processing techniques derive a linear model for each sub-region of an aerial image, and model both an additive effect and a multiplicative effect of the atmosphere. The advanced image processing techniques also consider adjacent images along a flight line, and therefore provide greater accuracy and less sensitivity to scene content. In other words, the advanced image processing techniques are locally optimal and globally consistent. Further, the advanced image processing techniques alleviate large brightness differences due to solar irradiance differences from larger image acquisitions spanning lengthy time intervals, such as across several hours or even multiple days.

The following detailed description will comprise two major sections. A first section provides a detailed description and examples for a large format aerial camera suitable for acquiring and outputting aerial images as illustrated in FIGS. 1-5. A second section provides a detailed description and examples for an aerial imaging system implementing advanced image processing techniques arranged to process aerial images acquired by a large format aerial camera as illustrated in FIGS. 6-10. The aerial imaging system may include an atmospheric and solar component arranged to correct for atmospheric and solar influences in aerial images. The corrected aerial images may be used for a number of use scenarios typical for digital aerial images, such as generating an ortho mosaic (aerial map) that is largely free of atmosphere and solar influences, among other use scenarios.

Large Format Aerial Camera

In various embodiments, a large format aerial camera may be used to acquire, capture or record aerial images. The aerial images may comprise still images (e.g., pictures) or moving images (e.g., video). In some embodiments, the large format aerial camera may be suitable for use in airborne optical registration of large surface areas of the earth, such as entire countries, continents, or even the entire world.

In one embodiment, for example, aerial images may be acquired by a large format aerial camera implemented as a multi-resolution large format digital camera having multiple optical systems and detector arrays, such as a MICROSOFT® ULTRACAM-G aerial camera, made by Microsoft Corporation, Redmond, Wash. Although some embodiments may be described with reference to aerial images acquired by a multi-resolution large format digital camera having multiple optical systems and detector arrays, it may be appreciated that the aerial imaging system and advanced atmospheric and solar component may correct aerial images acquired by any aerial digital camera. The embodiments are not limited in this context.

A multi-resolution large format digital camera may be capable of producing aerial images at different photographic scales. The multi-resolution large format digital camera can produce panchromatic images having a wide-angle geometry that are suitable for use in a photogrammetric workflow that includes image-based georeferencing and digital surface modeling. The multi-resolution large format digital camera can also concurrently produce multiple color images having a narrow-angle geometry suitable for use in a photogrammetric workflow that includes "ortho image" production. An ortho image is an image that shows ground objects in an orthographic projection. Because a single flight utilizing the multi-resolution large format digital camera can produce both wide-angle and narrow-angle images, the cost of mapping a large area can be reduced as compared to previous solutions.

The multi-resolution large format digital camera may include a primary camera system and two or more secondary camera systems. The primary camera system is configured for collecting panchromatic image data and the secondary camera systems are configured for collecting color image data. Each of the secondary camera systems has an optical system that has a longer focal length than the optical system of the primary camera system. The primary camera system and the secondary camera systems may be mounted within a common housing suitable for installation and use within an aircraft.

The primary camera system has an electro optical detector array capable of capturing the panchromatic image data. Each of the secondary camera systems has an electro optical detector array capable of capturing the color image data. The resolution of the electro optical detector in each of the secondary camera systems is greater than the resolution of the electro optical detector in the primary camera system. In some cases, the radiometric resolution of the secondary camera systems may be greater than the radiometric resolution of the primary camera system.

The primary camera system and the secondary camera systems may be configured such that the large format digital camera can produce images at two different image scales offering two different footprints. Images produced by the primary camera system have a larger footprint and are larger in size than those produced by the secondary camera systems and offer information for performing image-based georeferencing by means of photogrammetric triangulation. Images produced by the secondary camera systems have a smaller footprint and are smaller in size than those produced by the primary camera system and offer a high-resolution narrow angle color image. The color images produced by the secondary camera systems may be utilized as a source data set for high-resolution ortho image production. The footprint of the images generated by the secondary camera systems may be configured to overlap the footprint of the primary camera system in a direction perpendicular to a flight path.

The multi-resolution large format digital camera may be configured to generate a sequence of consecutive images along a flight line. The multi-resolution large format digital camera may be further configured such that the primary camera system produces a sequence of consecutive panchromatic images that overlap one another. The secondary camera systems may be configured to produce a sequence of consecutive color images that overlap one another and the images produced by the primary camera system. The overlap between consecutive panchromatic images may be greater than the overlap between consecutive color images.

FIG. 1 is a schematic diagram showing aspects of a large format digital camera 100 having multiple optical systems 106A-106B and detector arrays 110A-110B provided in one embodiment presented herein. As shown in FIG. 1, the large format digital camera 100 includes a primary camera system 104A and two or more secondary camera systems 104B-104N. Although FIG. 1 illustrates two secondary camera systems 104B-104N, it should be appreciated that other embodiments might include additional secondary camera systems 104B-104N. For instance, in an embodiment described below, the large format digital camera 100 includes four secondary camera systems 104B-104N.

According to one embodiment, the primary camera system 104A includes an optical system 106A that has a focal length 108A. Each of the secondary camera systems 104B-104N has an optical system 106B that has a focal length 108B that is longer than the focal length 108A of the optical system 106A. In this manner, the secondary camera systems 104B-104N are configured to produce images having a narrower field of view than images produced by the primary camera system 104A. Images produced by the primary camera system 104A have a wider field of view than images produced by the secondary camera systems 104B-104N. The optical systems 106A-106B may include other conventional optical elements to produce a suitable image at the desired focal length.

According to one implementation, the primary camera system 104A is configured with an electro optical detector array 110A capable of capturing panchromatic image data 112. As known in the art, a panchromatic image sensor, such as the electro optical detector array 110A, is sensitive to all or most of the entire visible spectrum. According to embodiments, each of the secondary camera systems 104B-104N is configured with an electro optical detector array 110B capable of capturing color image data 116. For instance, the secondary camera systems 104B-104N might be equipped with a suitable charge coupled device ("CCD") array configured for capturing the color image data 116A-116N, respectively. According to embodiments, the camera system presented herein is a frame camera (also referred to as a framing camera), as opposed to a camera that utilizes push-broom sensing.

It should be appreciated that the detector arrays 110A-110B comprise arrays of individual electro-optical detectors, e.g., semiconductor devices that output an electric signal, the magnitude of which is dependent on the intensity of light energy incident on such electro-optical detector. Therefore, the signal from each electro-optical detector in the arrays 110A-110B is indicative of light energy intensity from a pixel area of the portion of the object or terrain being photographed, and the signals from all of the individual electro-optical detectors in the arrays 110A-110B are indicative of light energy intensity from all of the pixel areas of the portion of the object or terrain being photographed. Consequently, the signals from the electro-optical detectors in each of the detector arrays 110A-110B, together, are indicative of the pattern of light energy from the portion of the object being photographed, so a sub-image of the portion of the object can be produced from such signals. First, however, the signals are amplified, digitized, processed, and stored, as is well known to those of ordinary skill in the art.

The electro-optical detector arrays 110A-110B are connected electrically by suitable conductors to a control circuit (not shown), which includes at least a microprocessor, input/output circuitry, memory, and a power supply for driving the electro-optical detector arrays 110A-110B, retrieving image data from of the arrays 110A-110B, and storing the image data. Other data processing functions, for example combining images and/or performing image display functions may be accomplished within the large format digital camera 100 or by other external data processing equipment.

According to implementations, the resolution of the electro optical detector arrays 104B in the secondary camera systems 104B-104N is greater than the resolution of the electro optical detector array 104A in the primary camera system 104A. In this manner, the large format digital camera 110 can produce a panchromatic image file 114 from the primary camera system 104A using a wide-angle geometry that is suitable for use in a photogrammetric workflow that includes image-based georeferencing and digital surface modeling. The large format digital camera 110 can also simultaneously produce multiple higher-resolution color image files from the secondary camera systems 104B-104N using a narrow-angle geometry suitable for use in a photogrammetric workflow that includes ortho image production.

As described briefly above, the primary camera system 104A and the secondary camera systems 104B-104N might be mounted within a common housing 102. In this embodiment, a front glass plate 120 might be mounted within the housing 102 to protect the optical systems 106A-106B. In alternate implementations, the primary camera system 104A and the secondary camera systems 104B-104N are mounted in separate housings (not shown). In both cases, the primary camera system 104A, the secondary camera systems 104B-104N, and the housing 102 are configured for mounting and use within an aircraft.

Figure 2:
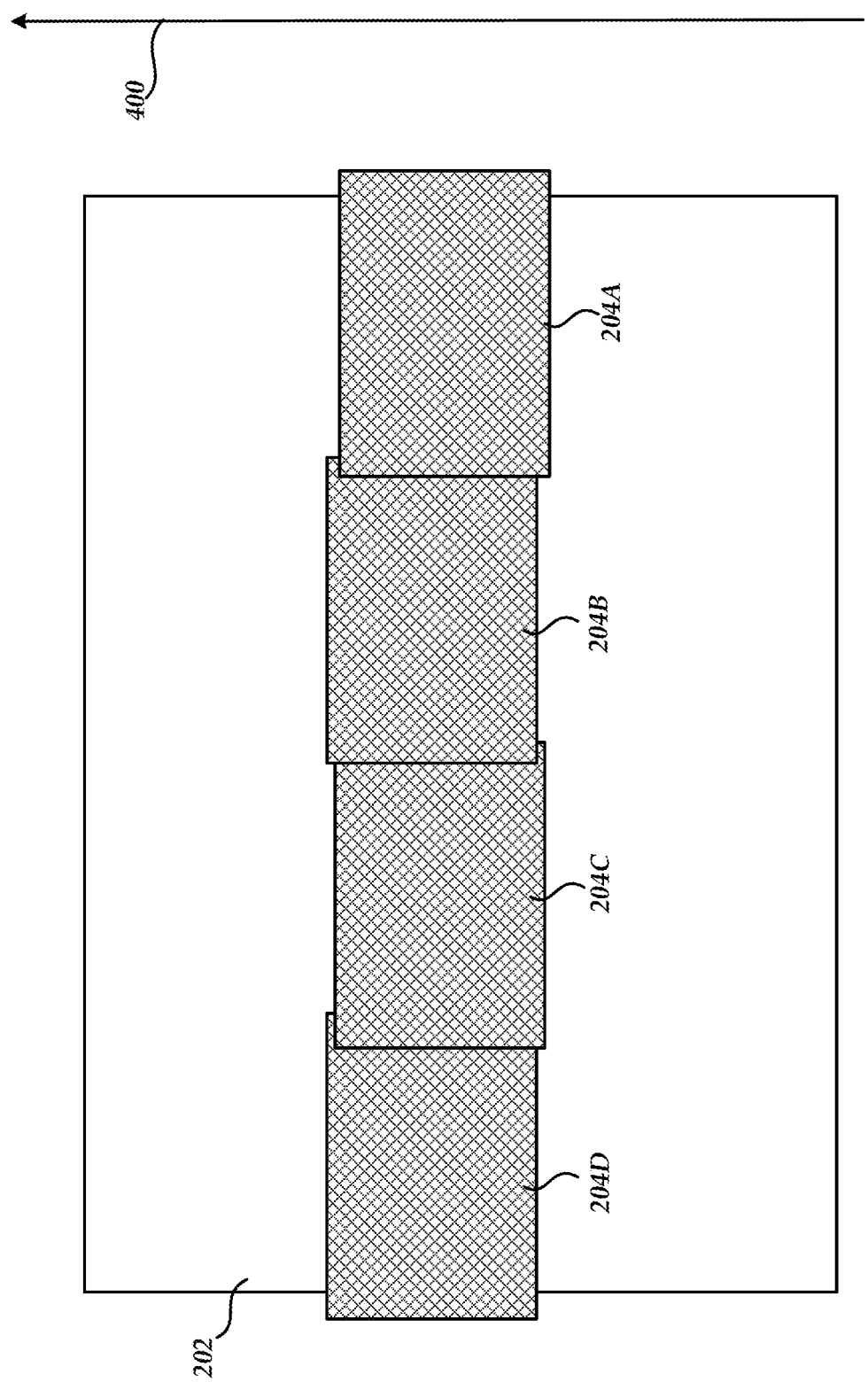
FIG. 2 is a schematic diagram showing the footprint of a primary camera system overlaid with the footprints of four secondary camera systems in a large format digital camera presented in one embodiment disclosed herein.

FIG. 2 is a schematic diagram showing the footprint 202 of the primary camera system 104A overlaid with footprints 204A-204B of the secondary camera systems 104B-104N in the large format digital camera 100 according in one embodiment disclosed herein. In this embodiment, the large format digital camera 100 includes four secondary camera systems 104B-104N configured with the footprints 204A-204D illustrated in FIG. 2, respectively. As shown in FIG. 2, the primary camera system 104A and the secondary camera systems 104B-104N are configured in one embodiment such that the large format digital camera 100 can produce overlapping images at two different image scales offering two different footprints 202 and 204A-204D. According to other embodiments, two primary camera systems 104A and four secondary camera systems 104B-104N are utilized.

According to one embodiment, images produced by the primary camera system 104A have a larger footprint 202 and are larger in size than those produced by the secondary camera systems 104B-104N. Images produced by the secondary camera systems 104B-104N have smaller footprint 204A-204D and are smaller in size than those produced by the primary camera system 104A and offer a higher resolution narrow angle color image.

As also illustrated in FIG. 2, the four secondary camera systems 104B-104N may be configured such that the footprints 204A-204D of the secondary camera systems 104B-104N cover the footprint 202 of the primary camera system 104A in a direction perpendicular to a flight line 400. In this way, the footprints 204A-204D of the four secondary camera systems 104B-104N cover a "stripe" of the footprint 202 of the primary camera system 104A in a direction perpendicular to the flight line 400. By overlapping the footprints 202 and 204A-204D in the manner shown in FIG. 2, a portion of the images produced by the primary camera system 104A can be enhanced by the images produced by the secondary camera systems 104B-104N.

Figure 3:
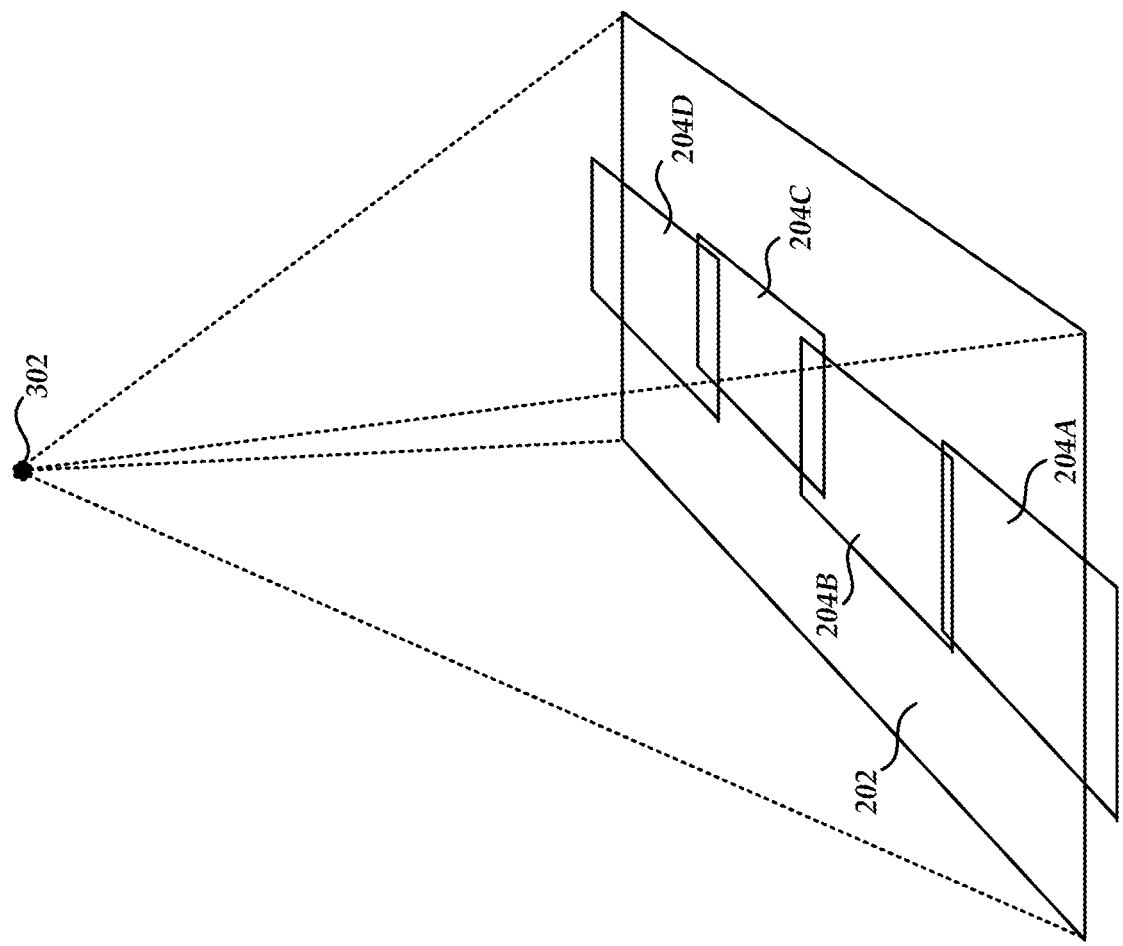
FIG. 3 is a perspective diagram showing a perspective view of the footprint of a primary camera system and the footprints of four secondary camera systems in a large format digital camera presented in one embodiment disclosed herein.

FIG. 3 provides a perspective view of the footprint 200 of the primary camera system 104A and the footprints 204A-204N of the four secondary camera systems 104B-104N when an image is taken from a common point 302 by the primary camera system 104A and the four secondary camera systems 104B-104N.

FIG. 4A shows a top-down view that illustrates the overlap between the footprints 202A-202D of a sequence of consecutive images taken with the primary camera system 104A and the footprint 204A-204D of a sequence of consecutive images taken with four secondary camera systems 104B-104N in the large format digital camera 100 in one embodiment disclosed herein. As discussed briefly above, the large format digital camera 100 may be mounted and configured for use within an aircraft (not shown). When the aircraft is flown according to a well-defined flight line 400, the large format digital camera 100 may be configured to capture a sequence of images along the flight line 400. FIG. 4A illustrates the footprints 202A-202D of a sequence of images taken using the primary camera system 104A and the footprints 204A-204D of a sequence of images taken using by four secondary camera systems 104B-104N along the flight line 400.

As illustrated in FIG. 4A, the large format camera 100 may be further configured such that the primary camera system 104A produces a sequence of consecutive panchromatic images that have footprints 202A-202D wherein consecutive sequential images overlap one another. The secondary camera systems 104B-104N may similarly be configured to produce a sequence of consecutive color images that have footprints 204A-204D wherein consecutive sequential images overlap one another and also overlap the images produced by the primary camera system 104A. The overlap between the footprints of consecutive panchromatic images may be greater than the overlap between the footprints of consecutive color images.

FIG. 4B is a perspective diagram illustrating the overlap between the footprints 202A-202D of a sequence of consecutive images taken on several flight lines 400 with the primary camera system 104A and the footprints 204A-204D of a sequence of consecutive images taken with four secondary camera systems 104B-104N in the large format digital camera 100 in one embodiment disclosed herein. If, as illustrated in FIG. 4B, images are produced by the primary camera system 104A and the secondary camera systems 104B-104N along multiple well-defined flight lines by means of aerial photogrammetric image acquisition, the footprints 202 of the primary camera system 104A overlap one another in the sequence of exposures along the flight lines. The footprints 204A-204D of the secondary camera systems 104B-104N also overlap with the footprints 202A-202D of the primary camera system 104A and the footprints 204A-204D of the four secondary camera systems 104B-104N.

Along the flight line 400 images are therefore produced in such a way that the sequence of images produced by the primary camera system 104A and the images produced by the secondary camera systems 104B-104N create continuous image strips of overlapping images. The flight lines may be defined in such a way that the large format digital camera 100 captures images covering an entire project area.

According to various embodiments, image acquisition by the secondary camera systems 104B-104N may be triggered substantially simultaneously with image acquisition by the primary camera system 104A and, accordingly, images from the secondary camera systems 104B-104N may be acquired at the same position and with the same camera attitude as images from the primary camera system 104A. Alternatively, the trigger for the secondary camera systems 104B-104N may be independent from the primary camera system 104A, e.g., may be at a higher rate than images captured by the primary camera system. Either embodiment, as well as any combination thereof, is contemplated to be within the scope of embodiments presented herein.

When the primary camera system 104A and the secondary camera systems 104B-104N are triggered at the same time, the images produced by the secondary camera systems 104B-104N may be registered to the images produced by the primary camera system 104A using the same trigger event. Additionally, images produced by the secondary camera systems 104B-104N may be calibrated to images of the primary camera system 104A through the use of a precisely surveyed and well-structured object (known as a "calibration object").

The images of the secondary camera systems 104B-104N may also be stitched to the images of the primary camera system 104B using traditional methods. Additionally, the images generated by the primary camera system 104A can be used to reconstruct the three dimensional form of an object (for instance, the buildings of a city by means of a digital surface model) and the images of the secondary camera system 104B, with a higher geometric resolution, may be used to extract high resolution photo texture which can then used for the production of ortho image maps.

Figure 5:
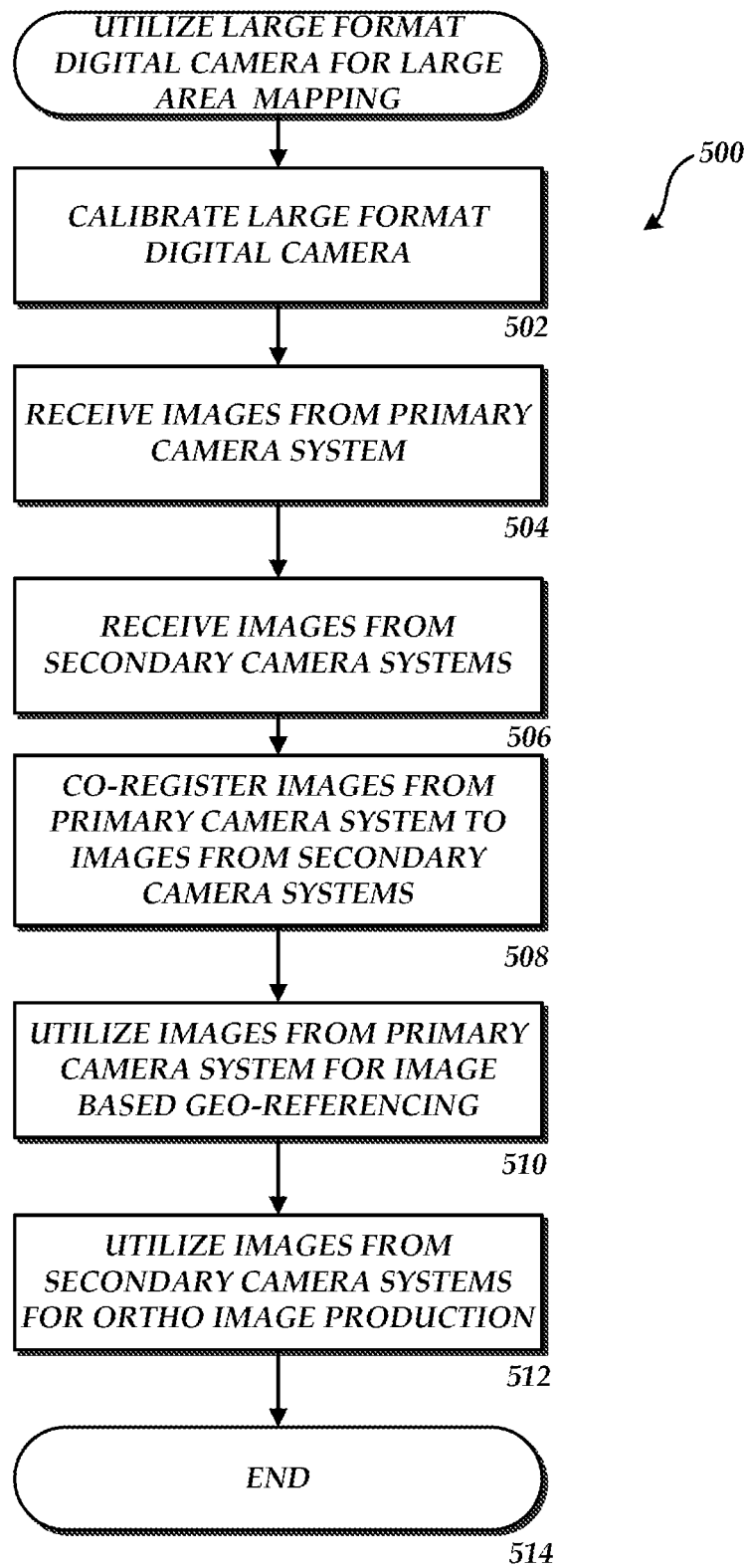
FIG. 5 is a flow diagram showing one illustrative process presented herein for the airborne optical registration of large areas using a multi-resolution digital large format camera with multiple detector arrays provided in one embodiment presented herein.

FIG. 5 provides additional details regarding the embodiments presented herein for a large format digital camera 100 having multiple optical systems and detector arrays. In particular, FIG. 5 is a flow diagram showing a routine 500 that illustrates one process presented herein for the airborne optical registration of large areas using the large format digital camera 100 described above.

The routine 500 begins at operation 502, where the large format digital camera 100 is calibrated. As discussed above, the large format digital camera 100 may be calibrated using a calibration object such that the footprint of images produced by the secondary camera systems 104B-104N overlap the footprint of images produced by the primary camera system 104A in the manner discussed above. As also discussed above, the large format digital camera 100 may be installed in an aircraft and utilized to capture ground images as the aircraft is flown along a well-defined flight line. Such images may be captured and stored in an appropriate digital storage device integrated with or external to the large format digital camera 100.

From operation 502, the routine 500 proceeds to operation 504 where panchromatic image files 114 are received from the primary camera system 104A. The routine then proceeds to operation 506, where the color image files 118A-118N are received from the secondary camera systems 104B-104N. Once the images files have been received from all of the camera systems 104A-104N, the routine 500 proceeds to operation 508, where the image files 114 from the primary camera system 104A are co-registered with the image files 118A-118N from the secondary camera systems 104B-104N.

From operation 508, the routine 500 proceeds to operation 510, where the image files 114 from the primary camera system 104A are utilized in a photogrammetric workflow that includes image-based georeferencing and digital surface modeling. From operation 510, the routine 500 proceeds to operation 512, where the image files 118A-118N from the secondary camera systems 104B-104N are utilized for ortho image production. The routine 500 proceeds from operation 512 to operation 514, where it ends.

Aerial Imaging System

Figure 6:
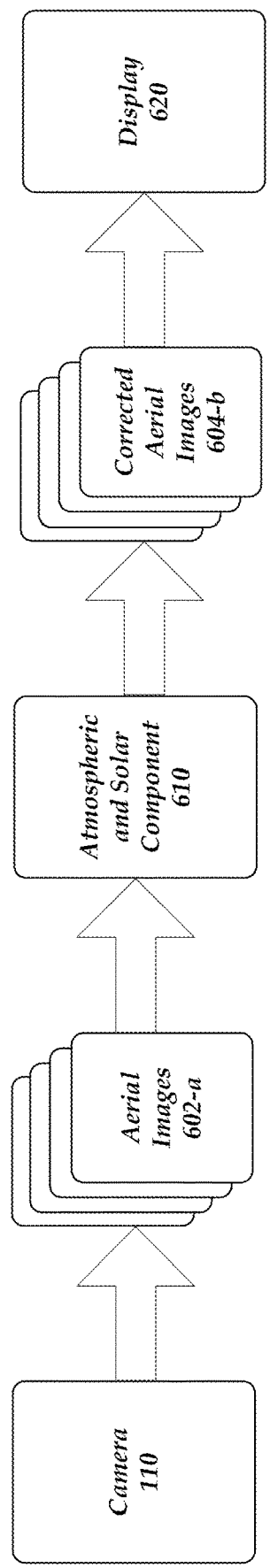
FIG. 6 is a block diagram showing an aerial imaging system for correcting aerial images acquired by a multi-resolution digital large format camera with multiple detector arrays provided in one embodiment presented herein.

FIG. 6 is a block diagram showing an aerial imaging system 600. The aerial imaging system 600 may be used for processing and correcting aerial images 602-$a$ acquired by an aerial digital camera, such as the large format digital camera 110, for example. It may be appreciated that other aerial digital cameras may be used as well, and the embodiments are not limited to the exemplary large format digital camera 110.

It is worthy to note that "a" and "b" and "c" and similar designators as used herein are intended to be variables representing any positive integer. Thus, for example, if an implementation sets a value for a=5, then a complete set of aerial image 602-$a$ may include aerial images 602-1, 602-2, 602-3, 602-4 and 602-5. The embodiments are not limited in this context.

The aerial imaging system 600 may comprise a computer-implemented system having one or more components, such as an atmospheric and solar component 610, for example. As used herein the terms "system" and "component" are intended to refer to a computer-related entity, comprising either hardware, a combination of hardware and software, software, or software in execution. For example, a component can be implemented as a process running on a processor, a processor, a hard disk drive, multiple storage drives of optical and/or magnetic storage medium, an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 6, the aerial imaging system 600 may be implemented as part of an electronic device. Examples of an electronic device may include without limitation a digital camera, an aerial digital camera, a large format digital camera, a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof.

In the illustrated embodiment shown in FIG. 6, the aerial imaging system 600 may comprise the large format digital camera 110, the atmospheric and solar component 610, and a digital display 620. Although the aerial imaging system 600 as shown in FIG. 6 has a limited number of elements in a certain topology, it may be appreciated that the aerial imaging system 600 may include more or less elements in alternate topologies as desired for a given implementation. For instance, the aerial imaging system 600 may further comprise other elements typically found in an aerial imaging system or an electronic device, such as computing components, communications components, power supplies, input devices, output devices, and so forth. The embodiments are not limited in this context.

The large format digital camera 110 may acquire and output a series of aerial images 602-$a$, such as aerial images as previously described with reference to FIGS. 1-5. In one embodiment, the large format digital camera 110 may be part of a camera platform used to elevate the camera 110 above a surface of the earth. In one embodiment, the camera platform may comprise an airplane flying a flight mission over a defined flight line, such as flight line 400, to acquire aerial images 602-$a$ of a particular surface area of the earth for airborne optical registration. Alternatively, a defined flight line may comprise a typical north-south flight line pattern for an aerial photograph acquisition. Such an acquisition produces overlapping aerial images 602-$a$, which are subsequently processed into a seamless ortho mosaic or aerial map.

The atmospheric and solar component 610 may implement various image processing techniques to correct atmospheric and solar influences from the aerial images 602-$a$ taken by the large format digital camera 110. To correct for undesired atmospheric influences, the atmospheric and solar component 610 derives a robust atmosphere mask which is applied to each pixel of an aerial image 602-$a$ while remaining insensitive (or independent) of scene content on the ground. The atmospheric and solar component 610 models undesired atmosphere effects with a linear relationship that is related to two physical phenomena due to light scattering and absorption in the atmosphere. A first physical phenomenon is additive path radiance caused by scattering which is modeled by an intercept term. A second physical phenomenon is a multiplicative attenuation factor caused by scattering and absorption which is modeled by a gain term. The atmospheric and solar component 610 uses the linear relationship as a good approximation of a sub-region of an aerial image 602-a, where a distance to the large format digital camera 110 can be considered a constant and therefore atmosphere effects are the same. To model the linear relationship accurately for each pixel in an aerial image 602-a, the atmospheric and solar component 610 models the atmosphere in a single aerial image 602-a by dividing the aerial image 602-a into a series of grids. After dividing an aerial image 602-a into a grid, however, a number of samples in each grid becomes smaller relative to the entire aerial image 602-a, and the atmosphere influence becomes harder to model given fewer samples. Depending on scene content, statistics derived from each grid might be insufficient to derive a robust atmosphere mask.

The atmospheric and solar component 610 solves this problem by aggregating statistics of grids across groups of aerial images 602-a, such as aerial images 602-a that have been captured close in time and/or on a same flight line. For example, the atmospheric and solar component 610 groups a series of aerial images 602-a taken along a same flight line. Pixels in one grid have approximately the same distance to the large format digital camera 110, and therefore undergo the same or similar atmospheric effects. Samples taken from a series of aerial images 602-a, rather than using a single grid or a single aerial image 602-a, may be used to derive an atmosphere mask insensitive to scene content. As a result, the atmospheric and solar component 610 can correct for atmosphere effects on each pixel of an aerial image 602-a by modeling and separating atmospheric effects from scene content.

To correct for undesired solar influences, which has a global effect on each aerial image 602-a in an aerial photography acquisition, the atmospheric and solar component 610 derives a robust solar irradiance model and a camera model that can adjust brightness of each aerial image 602-a to a preset mean brightness. The atmospheric and solar component 610 models solar irradiance by using a sun elevation angle with a multiplicative factor. The atmospheric and solar component 610 models light received by the large format digital camera 110 using a multiplicative factor comprising an exposure time and an aperture size. The two multiplicative factors are then multiplied and combined to one factor to scale each aerial image 602-a to a common mean brightness. After scaling operations, brightness levels for each aerial image 602-a are more uniform.

As shown in FIG. 6, the atmospheric and solar component 610 may receive as input one or more aerial images 602-a from the large format digital camera 110, perform advanced image processing operations on the aerial images 602-a, and output corrected aerial images 604-b. For instance, the atmospheric and solar component 610 may adjust color and brightness both globally and locally to correct for atmospheric and solar influences in aerial images 602-a to form corrected aerial images 604-b. The corrected aerial images 602-b may be used to generate a seamless and color-balanced ortho mosaic production. In some cases, the corrected aerial images 602-b can be further refined using subsequent image processing techniques, such as BRDF correction and seamline design techniques, for example.

The aerial imaging system 600 may present the corrected aerial images 604-b on the display 620. The display 620 may comprise any electronic display for presentation of visual, tactile or auditive information. Examples for the display 620 may include without limitation a cathode ray tube (CRT), bistable display, electronic paper, nixie tube, vector display, a flat panel display, a vacuum fluorescent display, a light-emitting diode (LED) display, electroluminescent (ELD) display, a plasma display panel (PDP), a liquid crystal display (LCD), a thin-film transistor (TFT) display, an organic light-emitting diode (OLED) display, a surface-conduction electron-emitter display (SED), a laser television, carbon nanotubes, nanocrystal displays, a head-mounted display, and so any other displays consistent with the described embodiments. In one embodiment, the display 620 may be implemented as a touchscreen display. A touchscreen display is an electronic visual display that can detect the presence and location of a touch within the display area. The touch may be from a finger, hand, stylus, light pen, and so forth. The embodiments are not limited in this context.

Figure 7:
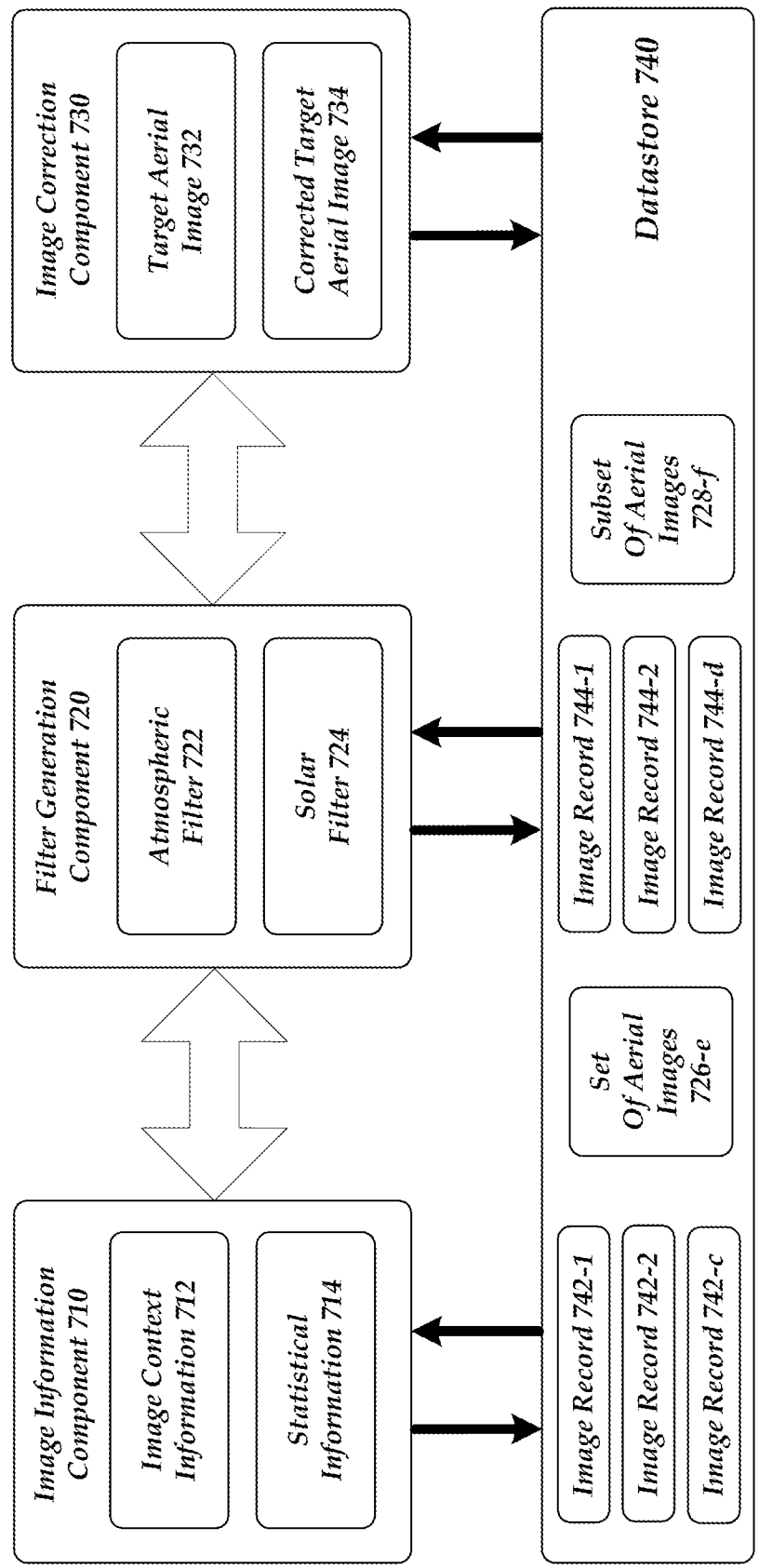
FIG. 7 is a block diagram showing an atmospheric and solar component for an aerial imaging system for correcting aerial images acquired by a multi-resolution digital large format camera with multiple detector arrays provided in one embodiment presented herein.

FIG. 7 is a more detailed block diagram of the atmospheric and solar component 610 of the aerial imaging system 600. Although the atmospheric and solar component 610 as shown in FIG. 7 has a limited number of elements in a certain topology, it may be appreciated that atmospheric and solar component 610 may include more or less elements in alternate topologies as desired for a given implementation.

The atmospheric and solar component 610 may include, among other elements, an image information component 710, a filter generation component 720 and an image correction component 730. The components 710, 720 and 730 may be communicatively coupled via various types of communications media. The components 710, 720 and 730 may coordinate operations between each other. The coordination may involve the uni-directional or bi-directional exchange of information. For instance, the components 710, 720 and 730 may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The image information component 710 may be generally arranged to generate image records 742-c associated with aerial images 602-a. An image record 742-c may be associated with a single aerial image 602-a, or in some cases, multiple aerial images 602-a. The image information component 710 may store the image records 742-c in a datastore 740. The datastore 740 and stored image records 742-c are accessible by the filter generation component 720 and the image correction component 730 during different image processing phases.

The image information component 710 may retrieve image context information 712 associated with one or more aerial images 602-a. The image context information 712 may comprise, among other types of information, image information, camera information and camera platform information. The image context information 712 may be retrieved from the datastore 740, an aerial image 602-a, a file or package containing an aerial image 602-a, or a remote datastore for another device (e.g., the large format digital camera 110 or an airplane computer). The image information component 710 may store the image context information 712 in an image record 742-c associated with a given aerial image 602-a.

The image context information 712 may comprise image information associated with one or more aerial images 602-*a* acquired by the large format digital camera 110. Examples of image information may include without limitation an image identifier, an image date, an image time, an image location, an image tag, an image label, or other image metadata.

The image context information 712 may comprise camera information associated with the large format digital camera 110 used to acquire one or more aerial images 602-*a*. Examples of camera information may include without limitation a camera identifier, a camera exposure time (e.g., shutter speed), a camera aperture size, a camera location (e.g., latitude, longitude and altitude coordinates), and other camera metadata.

The image context information 712 may comprise camera platform information associated with a platform for the large format digital camera 110 used to acquire a group of aerial images 602-*a*. Examples of camera platform information may include without limitation a camera platform identifier, a flight mission identifier, a flight line identifier, a camera platform location (e.g., latitude, longitude and altitude coordinates), and other camera platform metadata.

Along with image context information 712, the image information component 710 may retrieve or generate statistical information 714 associated with one or more aerial images 602-*a*. The image information component 710 may receive one or more aerial images 602-*a*, and generate statistical information 714 from information contained within the aerial images 602-*a*, such as pixel values. The image information component 710 may store the statistical information 714 in a same image record 742-*c* used to store image context information 712 associated with a given aerial image 602-*a* or set of aerial images 602-*a*. Alternatively, the image information component 710 may store statistical information 714 in a different image record 742-*c*, and link the different image records using a globally unique identifier (GUID).

The filter generation component 720 may generate an atmospheric filter 722 and a solar filter 724 from statistical information 714 and image context information 712 stored in image records 742-*c*. In one embodiment, for example, each atmospheric filter 722 and solar filter 724 may comprise one or more correction masks derived from the image context information 712 and statistical information 714. Each atmospheric filter 722 and solar filter 724 may be associated with one or more aerial images 602-*a*. The filter generation component 720 may retrieve information from the image records 742-*c*, process the retrieved information to form the atmospheric filter 722 and the solar filter 724, and store processed information for the filters 722, 724 in corresponding filter image records 744-*d* in the datastore 740.

The image correction component 730 may be generally arranged to correct atmospheric and solar artifacts from a target aerial image 732 using a respective atmospheric filter 722 and solar filter 724. A target aerial image 732 may comprise an aerial image that is currently being focused on for a particular set of image processing operations, such as an aerial image for which a set of filters 722, 724 are being designed, or an aerial image that is currently being corrected. The image correction component 730 may retrieve an appropriate atmospheric filter 722 and solar filter 724 from the image records 742-*c* and/or the filter image records 744-*d* for a given target aerial image 732, perform correction operations on the target aerial image 732, and output a corrected target aerial image 734. The corrected target aerial image 734 may be written to the datastore 740, or transported in real-time to another device.

Operations for the aerial imaging system 600 and the atmospheric and solar component 610 may be further described with reference to logic flows 800, 900. It may be appreciated that the representative logic flows 800, 900 do not necessarily have to be executed in the order presented, or in any particular order, unless otherwise indicated. Moreover, various activities described with respect to the logic flows 800, 900 can be executed in serial or parallel fashion. The logic flows 800, 900 may be implemented using one or more hardware elements and/or software elements of the described embodiments or alternative elements as desired for a given set of design and performance constraints. For example, the logic flows 800, 900 may be implemented as logic (e.g., computer program instructions) for execution by a logic device (e.g., a general-purpose or specific-purpose computer).

Figure 8:
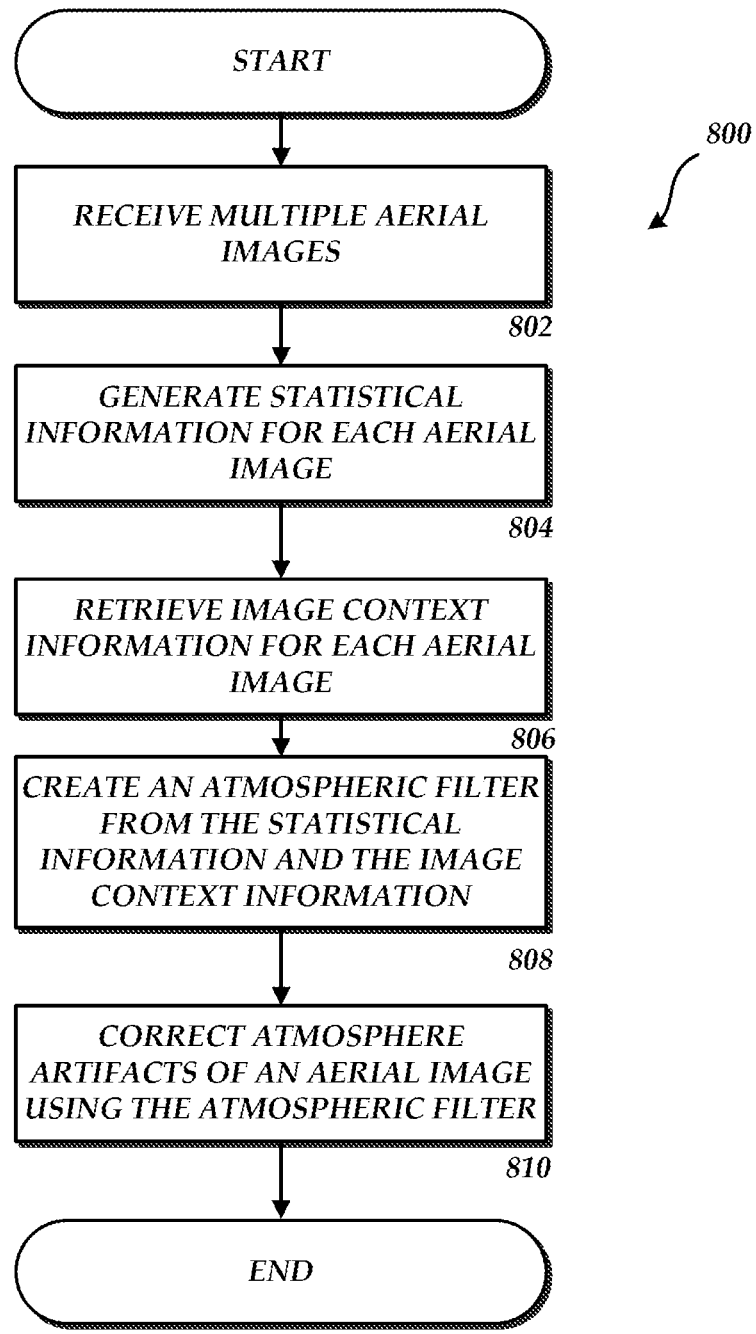
FIG. 8 is a flow diagram showing one illustrative process presented herein for correcting atmospheric influences in aerial images acquired by a multi-resolution digital large format camera with multiple detector arrays provided in one embodiment presented herein.

FIG. 8 illustrates one embodiment of a logic flow 800. The logic flow 800 may be representative of some or all of the operations executed by one or more embodiments described herein, such as the atmospheric and solar component 610 of the aerial imaging system 600, for example. In particular, the logic flow 800 may be implemented by the atmospheric and solar component 610 to correct for atmospheric influences in an aerial image 602-*a*.

In the illustrated embodiment shown in FIG. 8, the logic flow 800 may receive multiple aerial images at block 802. For example, the atmospheric and solar component 610 may receive multiple aerial images 602-*a* from the large format digital camera 110. In one embodiment, the aerial images 602-*a* may be temporally sequential aerial images 602-*a*. The embodiments, however, are not limited to this example.

The logic flow 800 may generate statistical information for each aerial image at block 804. For example, the image information component 710 may generate statistical information 714 for each aerial image 602-*a*. In one embodiment, the atmospheric and solar component 610 may generate statistical information 714 comprising a shadow percentile value and a standard deviation value for each grid within an aerial image 602-*a*, among other types of statistical information 714.

To generate statistical information 714, the image information component 710 may divide an aerial image 602-*c* into multiple grids. For each aerial image 602-*a*, the image information component 710 may divide an aerial image 602-*a* into a m-by-n grid, with each grid having the same dimensions such as width and height. Each grid is centered at locations calculated using Equation (1) and Equation (2), as follows:

$$\text{Grid\_center\_}x(\text{column}) = (\text{image\_width}/m) * \text{column} + (\text{image\_width}/2/m) \quad \text{Equation (1)}$$

$$\text{Grid\_center\_}y(\text{row}) = (\text{image\_height}/n) * \text{row} + (\text{image\_height}/2/n) \quad \text{Equation (2)}$$

The image information component 710 may calculate a shadow percentile value for each grid. For example, the image information component 710 may calculate a shadow percentile (e.g., 0.06 percentile) per channel (e.g., R, G, and B) from all pixels in a grid. In some cases, some pixels from a grid may be excluded. For example, if a water mask (e.g., geo-locations of lakes, ocean, rivers, etc.) is available, pixels of water in an image should be excluded from the statistics calculation. If saturated pixel values are known, those pixels should be excluded as well.

The image information component 710 may calculate a standard deviation value for each grid. For example, the image information component 710 may calculate a standard deviation per channel (e.g., R, G, and B) from all pixels in a grid. In some cases, some pixels from a grid may be excluded, such as those associated with a water mask or saturated pixels.

The image information component 710 may store the shadow percentile values and the standard deviation values in an image record 742-c for the aerial image 602-a. The image information component 710 may organize and store a shadow percentile value and a standard deviation value for each grid of an aerial image 602-a to an associated image record 742-c. The image record 742-c may implement any known data schema. In one embodiment, for example, the image record 742-c may be implemented as a comma delimited file (CSV). Each aerial image 602-a may have a separate associated image record 742-c, or a separate record in a compounded image record 742-c. The image record 742-c of a given aerial image 602-a can be retrieved for subsequent image processing operations. Each image record 742-c, or record within an image record 742-c, may be indexed by a globally unique identifier (GUID) to facilitate retrieval operations.

The logic flow 800 may retrieve image context information for each aerial image at block 806. For example, once the image information component 710 generates statistical information 714 for an aerial image 602-a, and stores the statistical information 714 to an image record 742-c, the image information component 710 may retrieve image context information 712 related to the aerial image 602-a from a datastore or datasource, and write the related image context information 712 to the same image record 742-c.

The logic flow 800 may create an atmospheric filter from the statistical information and the image context information at block 808. For example, the filter generation component 720 may create an atmospheric filter 722 from the statistical information 712 and the image context information 714 stored in one or more image records 742-c.

The filter generation component 720 may selectively group aerial images 602-a to form a set of aerial images 726-e using associated image context information 712 and an ordering algorithm. In one embodiment, for example, the filter generation component 720 may use an ordering algorithm to produce a set of aerial images 726-e sharing a nested order comprising a flight mission identifier, a flight line identifier, a camera exposure time, and a camera aperture size. Such an ordering algorithm is designed to produce a set of aerial images 726-e having similar, if not identical, illumination conditions (e.g., from the sun and atmosphere), and exposure settings, since they are continuous in time. The filter generation component 720 leverages this time-continuity concept to infer illumination conditions so that atmosphere correction information can be robustly estimated using a larger set of samples generated across the aerial images 726-e.

The filter generation component 720 may identify an image window of a subset of aerial images 728-f from a set of aerial images 726-e from the stream of received aerial images 602-c. Once grouped, the filter generation component 720 may sort a set of aerial images 726-e by time in ascending order. Alternatively, the filter generation component 720 can sort the aerial images 726-e with image numbers if the aerial images 726-e are numbered with a natural number in ascending order in time in a consistent manner. Once sorted, the filter generation component 720 may identify or select a subset of aerial images 728-f from the set of aerial images 726-e to form an image window. For a real-time system, the subset of aerial images 728-f may comprise a number of (k) previous aerial images before a target aerial image 732. For a non-real-time system, the subset of aerial images 728-f may comprise k/2 aerial images before the target aerial image 732, and k/2 aerial images after the target aerial image 732. In either case, if the number of aerial images found is less than k, they can be used but this condition should be marked as an edge condition for quality control purposes. Once identified, a resulting image window comprises a subset of aerial images 728-f having k+1 images, including a target aerial image 732 as a current (or center if non-real-time system) aerial image. The target aerial image 732 may comprise an aerial image within an image window for which a set of filters 722, 724 are being made.

The filter generation component 720 may generate a grid atmospheric haze additive term value for each grid of a target aerial image 732 using shadow percentile values from a subset of aerial images 728-f in an image window. For each image window, the filter generation component 720 may search and retrieve all image records 742-c associated with the subset of aerial images 728-f in the image window. For each channel, and for each grid, the filter generation component 720 retrieves all the shadow percentile values from the retrieved image records 742-c, and organizes them into a vector. The filter generation component 720 sorts them in ascending order, and takes the $p^{th}$ percentile. The $p^{th}$ percentile value is a grid atmospheric haze additive term value for a given grid. These operations are repeated for each grid of the target aerial image 732. The grid atmospheric haze additive term values collectively form a filtered additive haze mask (per-channel) for the target aerial image 732 of the image window.

The filter generation component 720 may generate a grid atmospheric correction gain term value for each grid of a target aerial image 732 using standard deviation values from a subset of aerial images 728-f in an image window. For each image window, the filter generation component 720 may search and retrieve all image records 742-c associated with the subset of aerial images 728-f in the image window. For each channel, and for each grid, the filter generation component 720 retrieves all the standard deviation values from the retrieved image records 742-c, and averages the standard deviation values to form a grid atmospheric correction gain term value. These operations are repeated for each grid in the target aerial image 732. The grid atmospheric correction gain term values collectively form one filtered atmospheric attenuation correction mask per channel (e.g., R, G, B, Infrared, Panchromatic, etc.), for the target aerial image 732 of the image window.

The filter generation component 720 may generate grid atmospheric haze additive term values and grid atmospheric correction gain term values for all aerial images within a set of aerial images 726-e using similar operations as described above. The filter generation component 720 may store grid atmospheric haze additive term values and grid atmospheric correction gain term values for each target aerial image 732 in a filter image record 744-d. As with the image records 742-c, a filter image record 744-d or a record in a filter image record 744-d may be indexed by a GUID for an aerial image 726-e so it may be retrieved for a given aerial image 726-e during image correction operations.

The logic flow 800 may correct atmosphere artifacts of an aerial image using the atmospheric filter at block 810. For example, the image correction component 730 may correct atmosphere artifacts of a target aerial image 732 using an atmospheric filter 722 designed for the target aerial image 732 by the filter generation component 720. For a given target aerial image 732, an atmospheric filter 722 may comprise grid atmospheric haze additive term values and grid atmospheric correction gain term values stored in a filter image record 744-d associated with the target aerial image 732. The image correction component 730 may correct atmosphere additive haze and multiplicative attenuation for a target aerial image 732 using its atmospheric filter 722.

In one embodiment, the atmosphere correction is a linear adjustment in accordance with Equation (3) as follows:

$$L(band,x,y)=g(band,x,y)*(L'(band,x,y)-haze(band,x,y)) \quad \text{Equation (3)}$$

where L' is the measured digital number (DN) value of a given band at pixel location (x,y), L is the atmosphere-corrected value, haze (band,x,y) is the grid atmospheric haze additive term value for a given band at pixel location (x,y), and g(band,x,y) is the grid atmospheric correction gain term value.

On a pixel basis, the image correction component 730 may calculate a pixel atmospheric haze additive term value for a pixel of a target aerial image 732 using grid atmospheric haze additive term values stored in a filter image record 744-d associated with the target aerial image 732. This may be accomplished two ways. First, the image correction component 730 may perform a bilinear or bicubic interpolation on the filtered additive haze mask of the given aerial image 726-e. The Bilinear or bicubic interpolation may use four neighboring grids that surround a given pixel location for the four interpolation corners. Second, if the number of rows (r) or the number of columns (c) of the grids is one, a natural cubic spline curve can be fitted to the one-dimensional grids (along the longer-dimension pixel coordinate, e.g., the x-coordinate if number of rows is one and the y-coordinate if number of columns is one). The natural cubic spline curve can be represented as a look-up table (LUT) at each pixel location. In this case, for example, each pixel location with a same y-coordinate value (when number of rows is one) will have the same value. Then the haze additive term value at a given pixel location can be looked up from the LUT.

On a pixel basis, the image correction component 730 may calculate a pixel atmospheric correction gain term value for a pixel of a target aerial image 732 using grid atmospheric correction gain term values stored in a filter image record 744-d associated with the target aerial image 732. The image correction component 730 may perform a bilinear or bicubic interpolation on each filtered atmospheric correction mask for each channel (e.g., R, G, or B) of the target aerial image 732 to retrieve interpolated values for the masks. Alternatively, the natural cubic spline curve fitting as previously described can be used if the grid configuration is one-dimensional. The image correction component 730 may calculate per-channel gain correction using Equation (4) as follows:

$$g(band,x,y)=std\_dev\_ref(x,y)/std\_dev(band,x,y) \quad \text{Equation (4)}$$

where std_dev_ref(x,y) is the reference value chosen from one of the three bands (e.g., green is chosen because human eyes are more sensitive to green).

The image correction component 730 may correct a pixel of a target aerial image 732 using a pixel atmospheric haze additive term value calculated for the pixel. The image correction component 730 may correct a given pixel in accordance with Equation (3) as previously described.

The image correction component 730 may correct a pixel of a target aerial image 732 using a pixel atmospheric correction gain term value calculated for the pixel. The image correction component 730 may correct a given pixel in accordance with Equation (3) as previously described.

Once all pixels for a target aerial image 732 are corrected, the image correction component 730 may output a corrected target aerial image 734. The image correction component 730 then selects a next target aerial image 732, and performs correction operations similar to those described above to form a next corrected target aerial image 734. The above correction operations may be performed for each of the aerial images 726-e.

Figure 9:
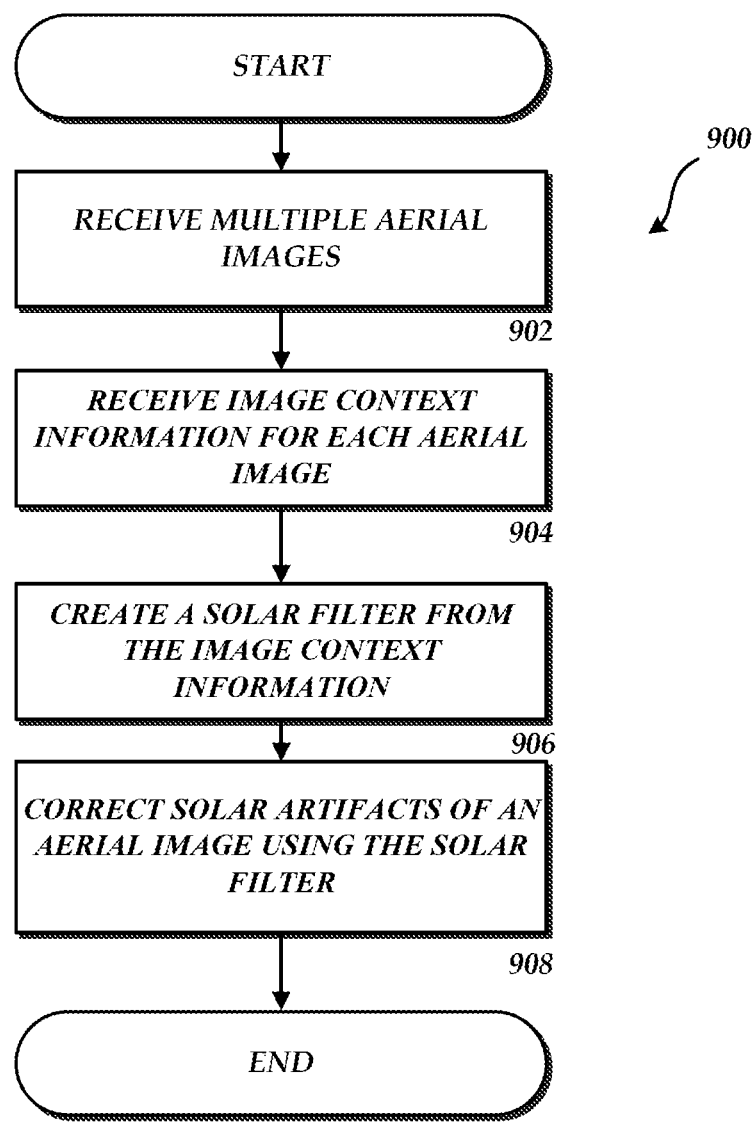
FIG. 9 is a flow diagram showing one illustrative process presented herein for correcting solar influences in aerial images acquired by a multi-resolution digital large format camera with multiple detector arrays provided in one embodiment presented herein.

FIG. 9 illustrates one embodiment of a logic flow 900. The logic flow 900 may be representative of some or all of the operations executed by one or more embodiments described herein, such as the atmospheric and solar component 610 of the aerial imaging system 600, for example. In particular, the logic flow 900 may be implemented by the atmospheric and solar component 610 to correct for solar influences in an aerial image 602-a.

In the illustrated embodiment shown in FIG. 9, the logic flow 900 may receive multiple aerial images at block 902. For example, the atmospheric and solar component 610 may receive multiple aerial images 602-a from the large format digital camera 110. In one embodiment, the aerial images 602-a may be temporally sequential aerial images 602-a. The embodiments, however, are not limited to this example.

The logic flow 900 may receive image context information for each aerial image at block 904. For example, the image information component 710 may receive image context information 712 for each aerial image 602-a. The image information component 710 may store image context information 712 for an aerial image 602-a in a same or different image record 742-c used to store the statistical information 714 derived for the aerial image 602-a as described in the logic flow 800.

The logic flow 900 may create a solar filter from the image context information at block 906. For example, the filter generation component 720 may create a solar filter 724 for a target aerial image 732 from the image context information 712.

The filter generation component 720 may calculate a sun elevation angle value for each aerial image 726-e. In one embodiment, the image information component 710 may retrieve image information for a target aerial image 732 from associated image context information 712, including an image date, an image time, and an image location. The image information component 710 may calculate a sun elevation angle (sunZenith) for each aerial image in a set of aerial images 726-e.

The filter generation component 720 may calculate an average sun elevation angle value (meanSunZenithDeg) from the multiple sun elevation angle values computed for a set of aerial images 726-e.

The filter generation component 720 may calculate a solar flux factor value for a target aerial image 732 from an average sun elevation angle value for a set of aerial images 726-e. The filter generation component 720 may calculate a solar flux factor value in accordance with Equation (5) and Equation (6) as follows:

$$targetSunZenith=M\_PI*meanSunZenithDeg/180.0 \quad \text{Equation (5)}$$

$$fluxFactor=cos(targetSunZenith)/cos(sunZenith) \quad \text{Equation (6)}$$

where targetSunZenith and sunZenith are in radians, and meanSunZenithDeg is in degrees.

The filter generation component 720 may calculate an average exposure time value and average aperture value for a set of aerial images 726-e. The filter generation component 720 may retrieve camera exposure time (exposureTime) and camera aperture size (aperture) for each aerial image 726-e using associated image context information 712, and calculate an average camera exposure time (meanExposureTime) and an average camera aperture size (meanAperture) of all the aerial images 726-e.

The filter generation component 720 may calculate an exposure normalization factor value for a target aerial image 732 from an average exposure time value and an average aperture value for a set of aerial images 726-e. The filter generation component 720 may calculate an exposure normalization factor value in accordance with Equation (7) as follows:

$$opCorrection=(meanExposureTime/exposureTime)*(aperture/\_meanAperture)*(aperture/\_meanAperture) \quad \text{Equation (7)}$$

The filter generation component 720 may calculate a total normalization factor value for a target aerial image 732 from a solar flux factor value and exposure normalization factor value for the target aerial image 732. The filter generation component 720 may calculate a total normalization factor value in accordance with Equation (3) as follows:

$$g\_norm(image)=fluxFactor(image)*opCorrection(image) \quad \text{Equation (8)}$$

The logic flow 900 may correct solar artifacts of an aerial image using the solar filter at block 908. For example, the image correction component 730 may correct solar artifacts of a target aerial image 732 using a solar filter 724 in accordance with Equation (9) as follows:

$$L\_final(band,x,y)=L(band,x,y)*g\_norm(x,y) \quad \text{Equation (9)}$$

The image correction component 730 may correct solar artifacts of a target aerial image 732 before or after atmospheric correction operations, as described with reference to the logic flow 800 of FIG. 8.

In addition to image correction, the atmospheric and solar component 610 may be arranged to perform further image processing operations on a corrected target aerial image 734. For instance, the atmospheric and solar component 610 may be further arranged to perform "hotspot removal" operations, which is a radiometric process to remove hotspots caused by micro shadows, which result in uneven illumination of aerial images with respect to the camera ray direction and the sun direction. In another example, the atmospheric and solar component 610 may be arranged to perform ortho rectification operations, which is a geometric process to correct an aerial image so that the scale is uniform like a map, without distortion. This is typically performed using a photogrammetric library using a digital elevation model (DEM) and bundle adjustment results. In yet another example, the atmospheric and solar component 610 may be arranged to perform ortho mosaic operations, which is a segmentation process to put together multiple ortho rectified images into one seamless mosaic using a max-flow-min-cut theory, for example. In still another example, the atmospheric and solar component 610 may be arranged to perform globally-aware-locally-adaptive (GALA) tone mapping to convert a larger aerial ortho from 16-bit camera range to 8-bit camera range.

Figure 10:
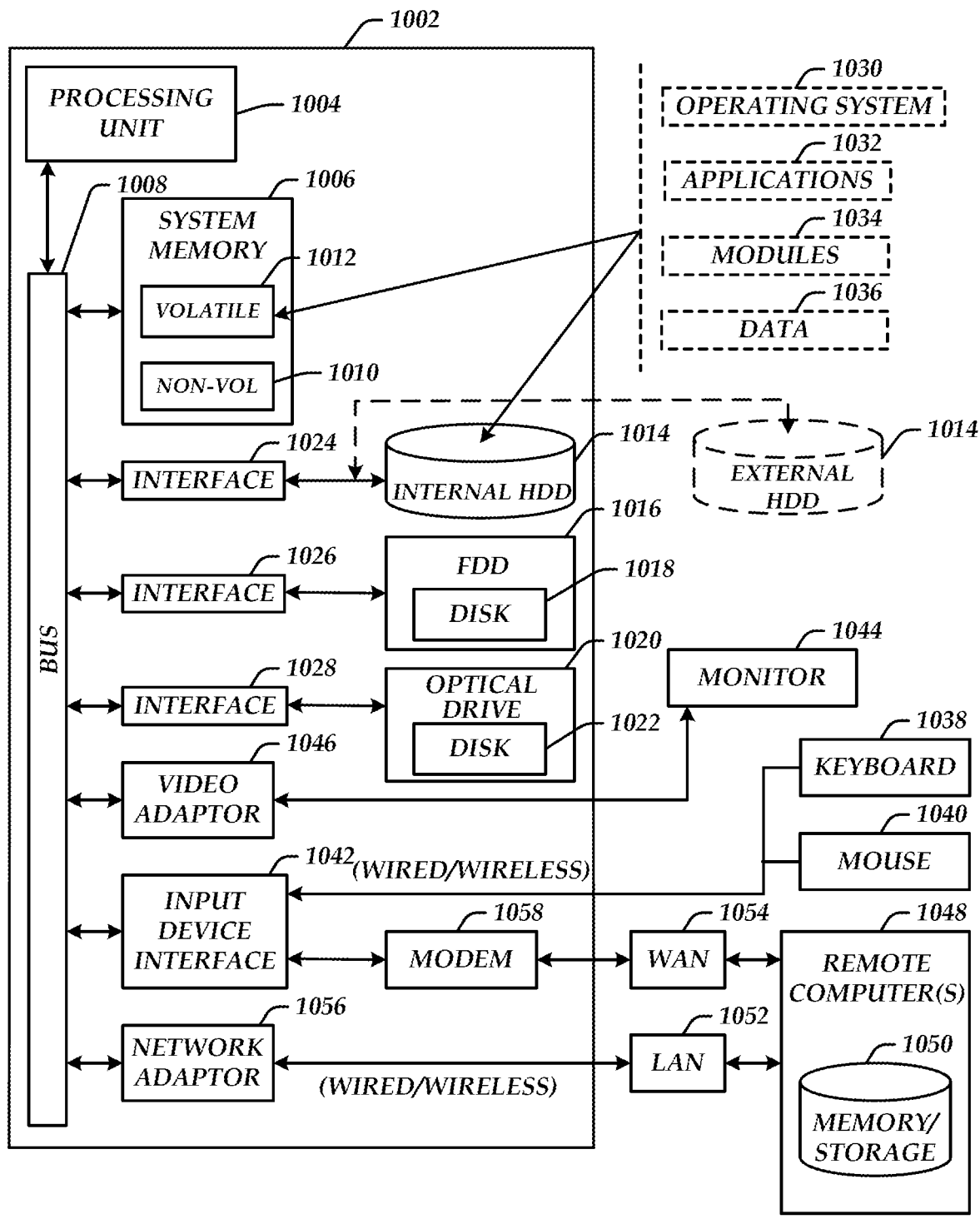
FIG. 10 is a block diagram of a computing architecture suitable for implementing an atmospheric and solar component for an aerial imaging system for correcting aerial images acquired by a multi-resolution digital large format camera with multiple detector arrays provided in one embodiment presented herein.

FIG. 10 illustrates an embodiment of an exemplary computing architecture 1000 suitable for implementing various embodiments as previously described. The computing architecture 1000 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors. Dual microprocessors and other multi-processor architectures may also be employed as the processing unit 1004. The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures.

The system memory 1006 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media, including an internal hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. The one or more application programs 1032, other program modules 1034, and program data 1036 can include, for example, the aerial imaging system 600.

A user can enter commands and information into the computer 1002 through one or more wire/wireless input devices, for example, a keyboard 1038 and a pointing device, such as a mouse 1040. Other input devices may include a microphone, an infrared (IR) remote control, a joystick, a game pad, a stylus pen, touch screen, or the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled,"

however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method to generate an atmosphere linear mask, comprising:
   receiving aerial images from a first camera configured to collect panchromatic image data and a second camera configured to collect color image data, wherein aerial images from the second camera overlap with aerial images from the first camera;
   grouping a set of aerial images based on image context information for each aerial image of the aerial images and an ordering algorithm, wherein the ordering algorithm uses at least location information and camera information to group a plurality of areal images have similar illumination conditions and exposure settings;
   dividing each aerial image of the set of aerial images into grids;
   generating statistical information for each aerial image of the set of aerial images;
   aggregating statistics of the grids across each aerial image of the set of aerial images;
   creating an atmospheric filter based at least in part on the statistical information and the image context information; and
   correcting atmosphere artifacts of an aerial image using the atmospheric filter.

2. The computer-implemented method of claim 1, further comprising:
   dividing an aerial image into multiple grids;
   calculating a shadow percentile value for each grid;
   calculating a standard deviation value for each grid, wherein the standard deviation is based on pixel values in each grid;
   storing the shadow percentile values and the standard deviation values in an image record for the aerial image; and
   storing the image context information associated with the aerial image in the image record.

3. The computer-implemented method of claim 2, further comprising:
   identifying an image window of a subset of aerial images from the set of aerial images;
   generating a grid atmospheric haze additive term value for each grid of a target aerial image using shadow percentile values from aerial images in the image window;
   generating a grid atmospheric correction gain term value for each grid of the target aerial image using standard deviation values from the aerial images in the image window; and
   storing the grid atmospheric haze additive term values and grid atmospheric correction gain term values for the target aerial image in a filter image record.

4. The computer-implemented method of claim 3, further comprising correcting atmosphere additive haze and multiplicative attenuation for the target aerial image using the grid atmospheric haze additive term values and the grid atmospheric correction gain term values stored in a filter image record associated with the target aerial image.

5. The computer-implemented method of claim 3, further comprising calculating a pixel atmospheric haze additive term value for a pixel of the target aerial image using grid atmospheric haze additive term values stored in the filter image record associated with the target aerial image.

6. The computer-implemented method of claim 3, further comprising calculating a pixel atmospheric correction gain term value for a pixel of a target aerial image using grid atmospheric correction gain term values stored in the filter image record associated with the target aerial image.

7. The computer-implemented method of claim 5, further comprising correcting at least one pixel of the target aerial image using the pixel atmospheric haze additive term value calculated for the pixel.

8. The computer-implemented method of claim 6, further comprising correcting at least one pixel of a target aerial image using the pixel atmospheric correction gain term value calculated for the pixel.

9. A computer storage device containing instructions that, when executed, enable a system to:
   receive aerial images from a first camera configured to collect panchromatic image data and a second camera configured to collect color image data, wherein aerial images from the second camera overlap aerial images from the first camera;
   receive image context information for each aerial image of the aerial images;
   group a set of aerial images based on image context information for each aerial image of the multiple aerial images and an ordering algorithm, wherein the ordering algorithm uses at least location information and camera information to group a plurality of areal images have similar illumination conditions and exposure settings;
   generate statistical information for each aerial image of set of the aerial images, wherein the statistical information comprises a shadow percentile value for each grid within an aerial image;
   create a solar filter from the image context information and the statistical information; and
   correct solar artifacts of an aerial image using the solar filter.

10. The computer storage device of claim 9, further comprising instructions that when executed enable the system to calculate a sun elevation angle value for each aerial image.

11. The computer storage device of claim 10, further comprising instructions, that when executed, enable the system to calculate an average sun elevation angle value from multiple sun elevation angle values for a group of aerial images.

12. The computer storage device of claim 11, further comprising instructions that, when executed, enable the system to calculate a solar flux factor value for a target aerial image from an average sun elevation angle value for the group of aerial images.

13. The computer storage device of claim 9, further comprising instructions that, when executed, enable the system to calculate an average exposure time value and average aperture value for a group of aerial images.

14. The computer storage device of claim 13, further comprising instructions that, when executed, enable the system to calculate an exposure normalization factor value for a target aerial image from an average exposure time value and an average aperture value for a group of aerial images.

15. The computer storage device of claim 14, further comprising instructions that, when executed, enable the system to calculate a total normalization factor value for a target aerial image from a solar flux factor value and exposure normalization factor value for the target aerial image.

16. A system for creating an atmosphere linear mask, the system comprising:
at least one processor;
a memory for storing and encoding computer executable instructions that, when executed by the at least one processor is operative to:
receive aerial images from a first camera configured to collect panchromatic image data and a second camera configured to collect color image data, wherein aerial images from the second camera overlap with aerial images from the first camera;
group a set of aerial images based on image context information for each aerial image of the aerial images and an ordering algorithm, wherein the ordering algorithm uses at least location information and camera information to group a plurality of areal images have similar illumination conditions and exposure settings;
divide each aerial image of the set of aerial images into grids;
generate statistical information for each aerial image of the set of aerial images, wherein the statistical information comprises a shadow percentile value for each grid within an aerial image;
aggregate statistics of the grids across each aerial image of the set of aerial images;
create an atmospheric filter based at least in part on the statistical information and the image context information; and
correct atmosphere artifacts of an aerial image using the atmospheric filter.

17. The system of claim 16, wherein the image context information comprises image information, camera information, and camera platform information.

18. The system of claim 16, wherein the image context information comprises camera information associated with a large format aerial camera used to acquire the aerial images.

19. The system of claim 16, wherein the image context information comprises camera platform information associated with a platform for a large format aerial camera used to acquire the aerial images.

20. The system of claim 18, wherein the large format aerial camera comprises a multi-resolution large format aerial camera with multiple detector arrays.

* * * * *